United States Patent
Berger et al.

(10) Patent No.: US 9,033,427 B2
(45) Date of Patent: May 19, 2015

(54) METHOD FOR HYDRAULICALLY BOOSTING AN ELECTRIC PARKING BRAKE OF A VEHICLE

(75) Inventors: Klaus Berger, Frankfurt (DE); Peter Leska, Dreieich (DE); Christian Strehle, Stuttgart (DE); Andreas Strecker, Frankfurt (DE); Eduard Wiens, Edelsberg (DE); Heinz-Anton Schneider, Niedernhausen (DE); Christof Maron, Kelkheim (DE); Jürgen Woywod, Mörfelden (DE); Klaus Dieter Pagel, Darmstadt (DE); Christian Kebbel, Rodgau (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 38 days.

(21) Appl. No.: 14/127,547

(22) PCT Filed: Jun. 19, 2012

(86) PCT No.: PCT/EP2012/061639
§ 371 (c)(1),
(2), (4) Date: Mar. 24, 2014

(87) PCT Pub. No.: WO2012/175468
PCT Pub. Date: Dec. 27, 2012

(65) Prior Publication Data
US 2014/0202801 A1 Jul. 24, 2014

(30) Foreign Application Priority Data

Jun. 20, 2011 (DE) .................. 10 2011 077 786
Jul. 12, 2011 (DE) .................. 10 2011 079 040

(51) Int. Cl.
| | |
|---|---|
| F16D 65/14 | (2006.01) |
| B60T 13/58 | (2006.01) |
| B60T 13/74 | (2006.01) |
| B60T 13/14 | (2006.01) |
| B60T 7/04 | (2006.01) |

(Continued)

(52) U.S. Cl.
CPC ............... *B60T 13/58* (2013.01); *B60T 13/588* (2013.01); *B60T 13/741* (2013.01);
(Continued)

(58) Field of Classification Search
CPC ..... B60T 13/58; B60T 13/588; B60T 13/146; F16D 65/14
See application file for complete search history.

(56) References Cited

U.S. PATENT DOCUMENTS

2006/0267402 A1    11/2006  Leiter
2010/0212314 A1*   8/2010   Isono ............................. 60/545

FOREIGN PATENT DOCUMENTS

DE    10 2008 051 350 A1    4/2009
DE    10 2010 029 391 A1    12/2010
(Continued)

OTHER PUBLICATIONS

PCT International Search Report—Oct. 18, 2012.

*Primary Examiner* — Vishal Sahni
(74) *Attorney, Agent, or Firm* — Brinks Gilson & Lione (57) ABSTRACT

A method for hydraulically boosting a vehicle electric parking brake having a hydraulic service brake and an electric parking brake. Application forces electically generated by the parking brake function is superimposed on the boosting brake force generated by a hydraulic boosting brake pressure provided by the service brake to the brake actuator. When the parking brake is actuated to generate a predetermined application force, the force generated by the brake actuator is detected as the actual value, if an actual value of the measured value is smaller than a first target value a boosting brake pressure value is applied to the brake actuator, and by means of the parking brake function an adjustment function for the tension of the brake actuator to which the hydraulic boosting brake pressure is applied is carried out to achieve the predetermined application force.

12 Claims, 4 Drawing Sheets

(51) Int. Cl.
*F16D 121/02* (2012.01)
*F16D 121/24* (2012.01)

(52) U.S. Cl.
CPC ........ *F16D 2121/02* (2013.01); *F16D 2121/24* (2013.01); *B60T 13/146* (2013.01); *B60T 7/04* (2013.01); *F16D 65/14* (2013.01)

(56) References Cited

FOREIGN PATENT DOCUMENTS

| | | |
|---|---|---|
| DE | 10 2010 030 276 A1 | 12/2010 |
| DE | 10 2009 029 525 A1 | 3/2011 |

\* cited by examiner

Fig. 3

METHOD FOR HYDRAULICALLY BOOSTING AN ELECTRIC PARKING BRAKE OF A VEHICLE

CROSS REFERENCE TO RELATED APPLICATIONS

This application claims priority to German Patent Application Nos. 10 2011 077 786.5, filed Jun. 20, 2011; 10 2011 079 040.3, filed Jul. 12, 2011; and PCT/EP2012/061639, filed Jun. 19, 2012.

FIELD OF THE INVENTION

The invention relates to a method for boosting an electric parking brake of a motor vehicle.

BACKGROUND

A combined vehicle brake is known from DE 102008051350 A1 that describes a hydraulically operable service brake and an electromechanically operable parking brake, also known as a fixing brake, wherein a hydraulic working pressure chamber within a brake housing is bounded by a brake piston, which can be subjected to hydraulic pressure medium on the one hand to perform service braking and on the other hand can be operated along a longitudinal axis of a piston by means of an irreversible transmission to achieve parking braking, and wherein the irreversible transmission converts the rotational motion of an electric motor into a translational motion of the brake piston to perform the parking brake process and holds the brake piston in the activated position by the self-locking of the transmission.

Such a parking brake system also includes an electronic controller, which generally corresponds to the driving dynamics controller (DDC controller) of the motor vehicle and contains the known hydraulic and electric components as well as additionally two full bridges for independent control of two direct current motors of the two parking brakes on the rear wheels of the motor vehicle.

With such a parking brake system, customer and safety requirements regarding price, performance, noise, safety, availability and comfort are to be achieved, which are often in conflict with each other.

The design of such systems must therefore be selected such that under normal ambient conditions, e.g. regarding the voltage of the on-board electrical system and the temperature of the electric motors of the parking brake, the necessary application force, which must reach a minimum value, can be reliably applied. For cost reasons, the application force is not directly measured for this purpose, but is determined indirectly from other parameters representing the application force. Thus e.g. for applying the electric parking brake described above a predetermined maximum or switch-off current of the electric motor is used as a switch-off criterion, whereby it is assumed that the target application force of the limit value is achieved as a target force value.

However, this method cannot guarantee safe stopping of the vehicle in all situations, because e.g. at increased temperature and/or low operating voltage the desired switch-off current is no longer achieved.

To solve the problem it is known e.g. from DE 10 2010 029 391 A1 to use the vehicle hydraulics in support of achieving the necessary application force. For this purpose, prior to the application process on the parking brake, it will be decided whether a hydraulic boost is necessary using existing temperature values on the brake actuators and using acceleration values of the wheels. According to the known method according to DE 10 2010 029 391 A1, the hydraulic boosting brake pressure is generated such that in the event of operating the parking brake pressure medium is initially taken from the front wheel brakes and transferred to build up a boosting brake pressure in the parking brakes on the rear wheels, and only then is application of the parking brake performed.

With the known method of hydraulically boosting the parking brake function, prior to applying the parking brake it must be decided whether a hydraulic boost is necessary. This leads to the disadvantage that too often a hydraulic boost is performed although it would not have been necessary. Such behavior represents a significant loss of comfort for the driver.

The object of the invention is to specify a method for the hydraulic boosting of an electric parking brake of a vehicle of the above-mentioned type, with which the disadvantages can be avoided.

This object is achieved by a method with the features described herein.

SUMMARY AND INTRODUCTORY DESCRIPTION OF THE INVENTION

The method according to the invention for hydraulic boosting of an electric parking brake of a vehicle comprising at least one brake actuator, which includes a hydraulic service brake function and an electric parking brake function for electric and hydraulic operation of the at least one brake actuator, wherein an application force electrically generated with the parking brake function is overlaid with a boosting brake force generated by subjecting the brake actuator to a hydraulic boosting brake pressure provided by the service brake function, is characterized according to the invention such that when the parking brake is operated to generate a specified application force, the application force generated by the brake actuator is detected as an actual value by means of a measurement variable representing its value, in the event of an actual value of the measurement variable that is smaller than a first target value representing a first target force value of the application force, the brake actuator is subjected to a hydraulic boosting brake pressure corresponding to a specified target boosting brake pressure value, and a further application function is performed by means of the parking brake function to further apply the brake actuator that is subjected to the hydraulic boosting brake pressure to achieve the specified application force.

With the method according to the invention, a hydraulic boost will only be performed or requested if it is actually necessary, i.e. the actual value of the measurement variable representing the application force, which preferably represents the motor current of the electric motor of the parking brake, does not reach a switch-off current value or a current limit value as the target value corresponding to a first target force value. Moreover, the energy expended to generate the hydraulic boosting brake pressure is low because the brake piston has already been moved close to the desired end position by the parking brake function.

A hydraulic pump is used to generate the hydraulic boosting brake pressure in an obvious manner as a means of generating pressure and is controlled by means of the service brake function. Because the brake piston of the brake actuator has already been moved close to its end position by means of the parking brake function, the volume to be supplied by the hydraulic pump remains small, i.e. the energy consumption of the hydraulic pump is low.

In one embodiment of the invention the target boosting brake pressure value is set to a value at which the resulting boosting brake force corresponds to the first target force value, i.e. the necessary application force, wherein following the generation of the hydraulic boosting brake pressure corresponding to the target force value the means of pressure generation is switched off and the boosting brake pressure applied to the brake actuator is hydraulically confined in the brake actuator. In this way the brake piston of the brake actuator is subjected to the boosting brake pressure corresponding to the desired final value of the application force in order to be able to perform the further application.

The subsequent further application of the parking brake takes place according to another embodiment of the invention by controlling the brake actuator that is subjected to the confined boosting brake pressure by means of the parking brake function, until the actual value of the measurement variable of the application force corresponds to a target value that is smaller than the first target value corresponding to the first target force value. The target value can thereby be selected such that a slight movement of the brake piston of the brake actuator is initiated, i.e. the electric motor provided to drive the brake actuator performs some revolutions. Rapid and smooth-running driving of the brake actuator to the brake disks is achieved by this slight control of the brake actuator.

According to another embodiment of the invention the target boosting brake pressure value corresponds to a target inlet pressure value at which the resulting boosting brake force is smaller than the first target force value, wherein following the generation of the hydraulic boosting brake pressure the means of generating pressure is not switched off, so that the brake actuator continues to be subjected to the generated boosting brake pressure. According to the development, displacement control is subsequently activated for further application of the parking brake by adjusting the brake piston of the brake actuator, which is subjected to the boosting brake pressure of the parking brake function, to a position corresponding to the specified application force target using a stored displacement-force characteristic. If the target position is not achieved with the brake piston with the further application of the parking brake by determining its actual position, an error message is generated for the vehicle driver.

Instead of the displacement control, according to one embodiment of the invention the further application of the parking brake can also be performed by detecting the actual value of the measurement variable, which represents the application force generated by the brake actuator, during the further application of the brake actuator by means of the parking brake function and ending the further application if the actual value of the measurement variable reaches a second target value corresponding to a second target force value, at which the second target force value is reduced relative to the first target force value by a force value corresponding to the boosting brake pressure. Preferably, with the embodiment an error message is also generated if the actual value of the measurement variable does not reach the second target value.

In an advantageous manner, prior to performing the further application using the second target value of the measurement variable the brake actuator that is subjected to the boosting brake pressure can be controlled by means of a displacement control by a small displacement in the releasing direction of the parking brake in order to achieve thereby a defined position for the subsequent further application.

According to one advantageous development of the invention, the hydraulic boosting brake pressure is reduced after performing the further application function.

In order to perform the parking brake function the brake actuator is driven by an electric motor, so that it is convenient to detect the motor current of the electric motor as the measurement variable representing the application force.

BRIEF DESCRIPTION OF THE DRAWINGS

The method according to the invention is explained in detail and described below with reference to the accompanying figures. In the figures.

DETAILED DESCRIPTION

Figure 1:
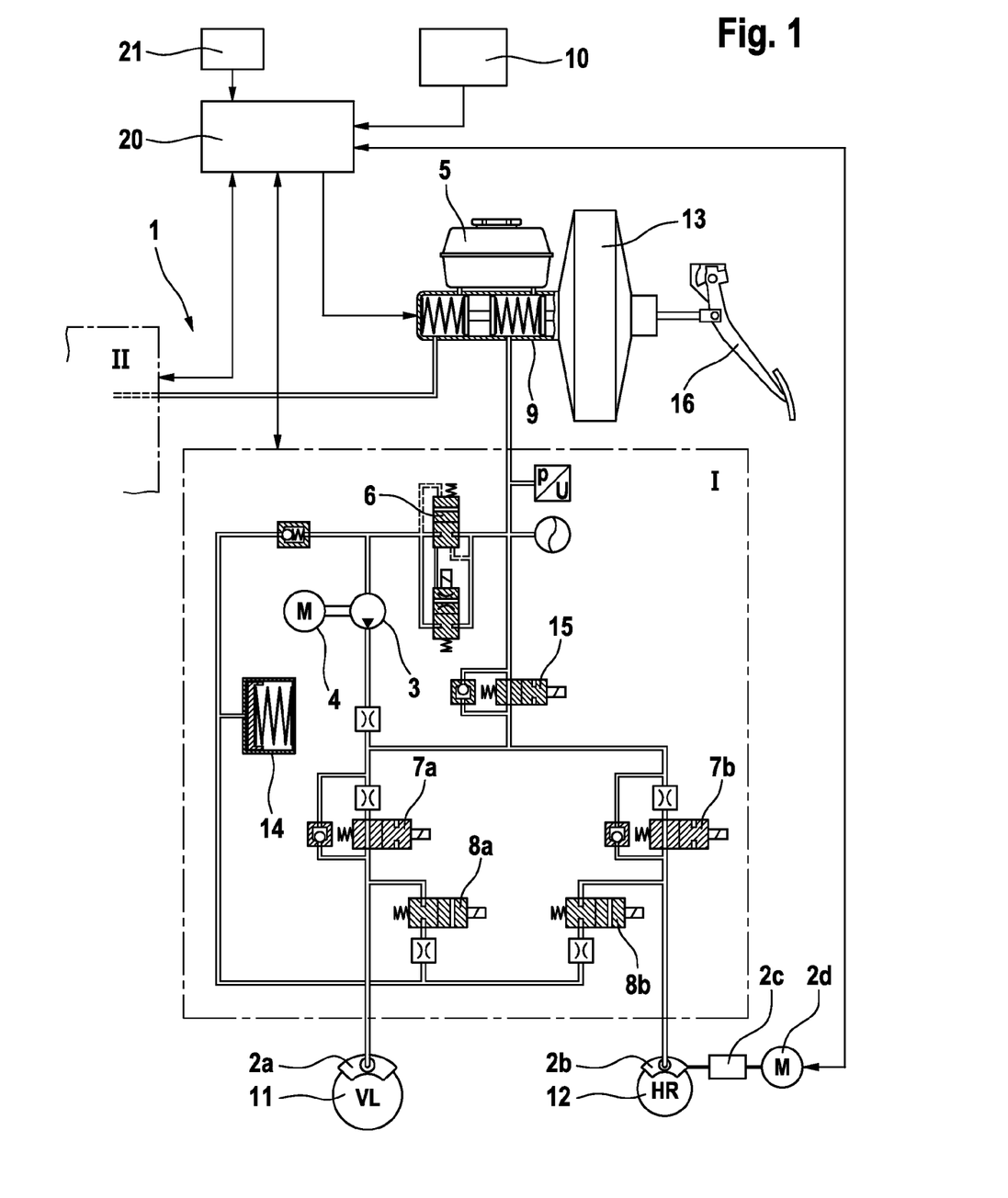
FIG. 1 shows a schematic block circuit diagram of a brake system for performing the method according to the invention.

FIG. 1 shows a brake system 1 of a motor vehicle with a controller 20 of a driving dynamics control system (DDC System), to which the sensor data of a DDC sensor 21 and state signals of a parking brake switch 10 are supplied, wherein the application or release of a parking brake by the driver of the motor vehicle can be initiated with the parking brake switch 10. For this purpose the controller 20, besides performing a service brake function by means of the brake system, additionally performs a parking brake function by controlling components of a parking brake that are explained below.

The controller 20 controls a brake system 1, wherein FIG. 1 only shows a brake circuit I for a front left wheel 11 and a rear right wheel 12 connected to a brake cylinder (tandem master cylinder) 9; a second brake circuit II is correspondingly designed and is likewise connected to the brake cylinder 9 and is only illustrated in outline. Wheel brakes of the wheels 11 and 12 with a brake caliper 2a or 2b are each connected via a hydraulic line to the brake circuit I, wherein the rear wheels 12 are each designed as a parking brake with a brake actuator 2c, which are operated by direct current motors 2d independently of a hydraulic pressure application.

To perform the parking brake function, the controller 20 is connected to the brake actuators 2c in order to control direct current motors 2d. The rotary motion of the direct current motors 2d is converted into a linear movement of a brake piston of the brake actuator 2c via a transmission, so that the torque of the direct current motor 2d acts on the brake caliper 2b via the brake piston as an application force F. Following switching off of the motor current I the generated application force F is maintained because of the self-locking of the transmission.

The application force F itself is not measured. When applying the parking brake the direct current motor 2d is driven in the application direction with a positive applied voltage via an H bridge, i.e. for example by the controller 20. After the motor has run up, the current rapidly reduces to a minimal value, the so-called no-load current, while the maximum revolution rate is set. After the linings have come into contact with the brake disks, i.e. after overcoming the air gap, a force builds up and the current increases. The brake piston of the brake actuator is now driven by the direct current motor 2d until a specified, defined target value $I_{target}$ of the motor current I is reached as the actual value $I_{actual}$ or is exceeded. The application force $F_{target}$ associated with the corresponding current value $I_{Target}$ is then reached and the direct current motor 2d is switched off.

For setting the necessary application force $F_{target}$ the motor current I of the direct current motor 2d is measured and the voltage applied to the direct current motor is specified by the controller 20, which is connected to a not illustrated H bridge, according to the necessary direction, depending on whether application or release is to be carried out. Once a defined target value $I_{target}$ of the motor current I is reached as the actual value $I_{actual}$ or is exceeded, the direct current motor 2d is switched off. Said target value corresponds to the necessary application force $F_{target}$ here.

The target values $I_{target}$ of the motor current I are determined by measuring the properties of the brake actuators 2c by experiment and storing the corresponding current values used as target values $I_{target}$ in a characteristic of the controller 20.

The position of the brake piston of the brake actuator 2c or the revolution rate of the direct current motor 2d is likewise not detected directly but is estimated by means of a model.

The brake system 1 includes a brake booster 13 connected to the brake master cylinder 9 and a reservoir 5 for the brake fluid or the hydraulic fluid. The brake cylinder 9 generates at the outlet a brake pressure corresponding to a brake pedal 16 that is connected to the brake booster 13 and that is operated by a driver. The brake pressure is supplied via an opened isolating valve 15 to an opened inlet valve 7a or 7b respectively on the inlet side so that a corresponding hydraulic brake pressure can build up at the wheels 11 and 12 by means of the brake calipers 2a and 2b. The two inlet valves 7a and 7b are normally open. The brake booster 13 with the brake master cylinder 9 is connected to the controller 20.

A normally closed outlet valve 8a or 8b connects the brake calipers 2a or 2b to a low pressure reservoir 14, which for its part is connected to a hydraulic pump 3 on the suction side and can be connected via a change-over valve 6 to the brake master cylinder 9.

The hydraulic pump 3 is provided for the brake calipers 2a and 2b in order, e.g. in the case of an ABS or DDC application, to force back out the brake medium that is displaced in the low pressure reservoir 14 during a pressure reduction or in order to generate a hydraulic boosting brake pressure $P_u$ at the rear wheels 12 when triggering the parking brake, if the necessary application force $F_{e,target}$ cannot be generated. The brake piston of the brake actuator 2c is subjected to the hydraulic boosting brake pressure $P_u$ and is superimposed with the application force $F_e$ electrically generated by means of the direct current motor 2d.

The hydraulic pump 3 is driven by an electric motor 4, which is itself controlled by the controller 20 using pulse width modulation (PWM). The electric motor 4 is controlled here such that the hydraulic pump 3 can build up a brake pressure on the high pressure side by drawing in brake fluid on the suction side.

Thus during control of the hydraulic pump 3 in stepper motor mode, brake fluid can be sucked out of the pressure chamber of the brake caliper 2a or 2b, the change-over valve 6 and the inlet valve 7a or 7b are closed, while the outlet valve 8a or 8b is opened to make the connection to the pressure chamber.

A first exemplary embodiment of the invention is described below in combination with the process diagram according to FIG. 2 and the brake system according to FIG. 1. Wherein the description related to the brake circuit I also relates to the brake circuit II.

Following the start (step SI: "Start") of the process and the detection of a shut parking brake switch 10 by the controller 20 according to step S2 ("parking brake closed"), application of the brake caliper 2b to the rear wheel 12 takes place with step S3 by the controller 20 controlling the direct current motor 2d accordingly by means of the parking brake function.

The necessary application force $F_{1,target}$ corresponds to a specified target value $I_{1,target}$ of the motor current of the direct current motor 2d ($I_{1,target}=F_{1,target}$). Therefore in step S4 the actual value $I_{actual}$ of the motor current I is detected and compared with the target value $I_{1,target}$. If the target value $I_{1,target}$ is reached or exceeded by the actual value $I_{actual}$ the process is terminated with step S8 ("End").

In another case the controller 20 requests a hydraulic boost, i.e. a hydraulic boosting pressure $P_u$, to which the brake piston of the brake actuator 2c is subjected, is generated by the hydraulic pump 3 according to step S5 ("Generate $P_u$") by means of the service brake function. The target value $P_{u,target}$ of the boosting pressure $P_u$ to be generated corresponds here to the necessary application force $F_{1,target}$. The boosting brake pressure $P_u$ corresponding to the target value $P_{u,target}$ is only built up at the parking brakes of the rear wheels 12. For this purpose the inlet valve 7b is opened and the outlet valve 7a of the brake caliper 2a on the front wheel 11 is closed and the outlet valves 8b of the brake caliper 2b of the rear wheel 12 also remains closed. Following the buildup of pressure at the parking brakes, the hydraulic boosting brake pressure $P_u$ is confined within the brake actuator 2c by the inlet valve 7b being closed. The hydraulic pump 3 is then switched off.

Subsequently with step S6 a further application of the brake caliper 2b of the parking brake is performed by controlling the direct current motor 2d until its motor current I reaches a target value $I_{2,target}$ that is lower than the first target value $I_{1,target}$. The second target value $I_{2,target}$ is selected such that a small rotary motion of the direct current motor 2d is achieved, so as to cause thereby a slight associated driven movement of the brake piston of the brake actuator 2c on the brake caliper 2b under the effect of the confined boosting brake pressure $P_u$. The built up application force F is maintained because of the irreversible transmission even following the opening of the valves 7b and 8b to reduce the pressure according to step S7 ("Reduce $P_u$").

Figure 2:
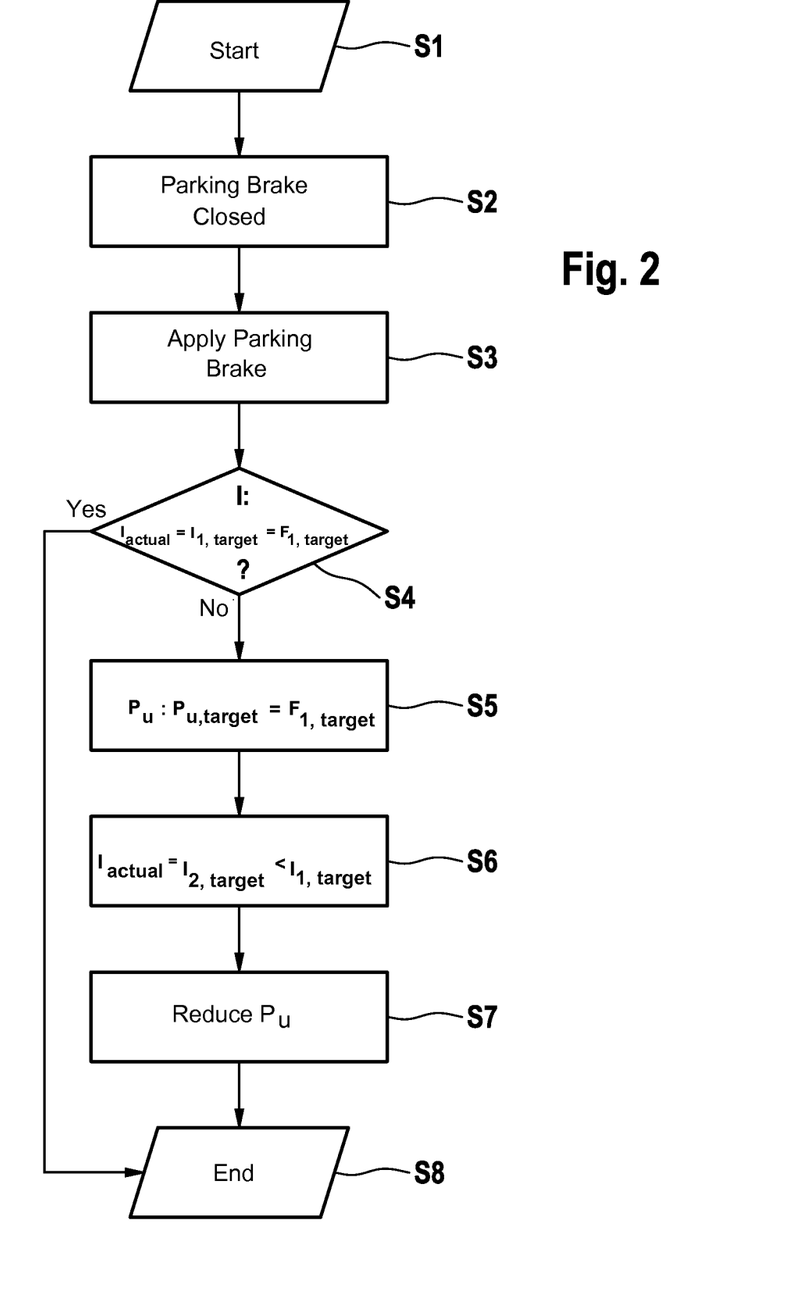
FIG. 2 shows a schematic process diagram for explaining a first exemplary embodiment of the invention.
Figure 3:
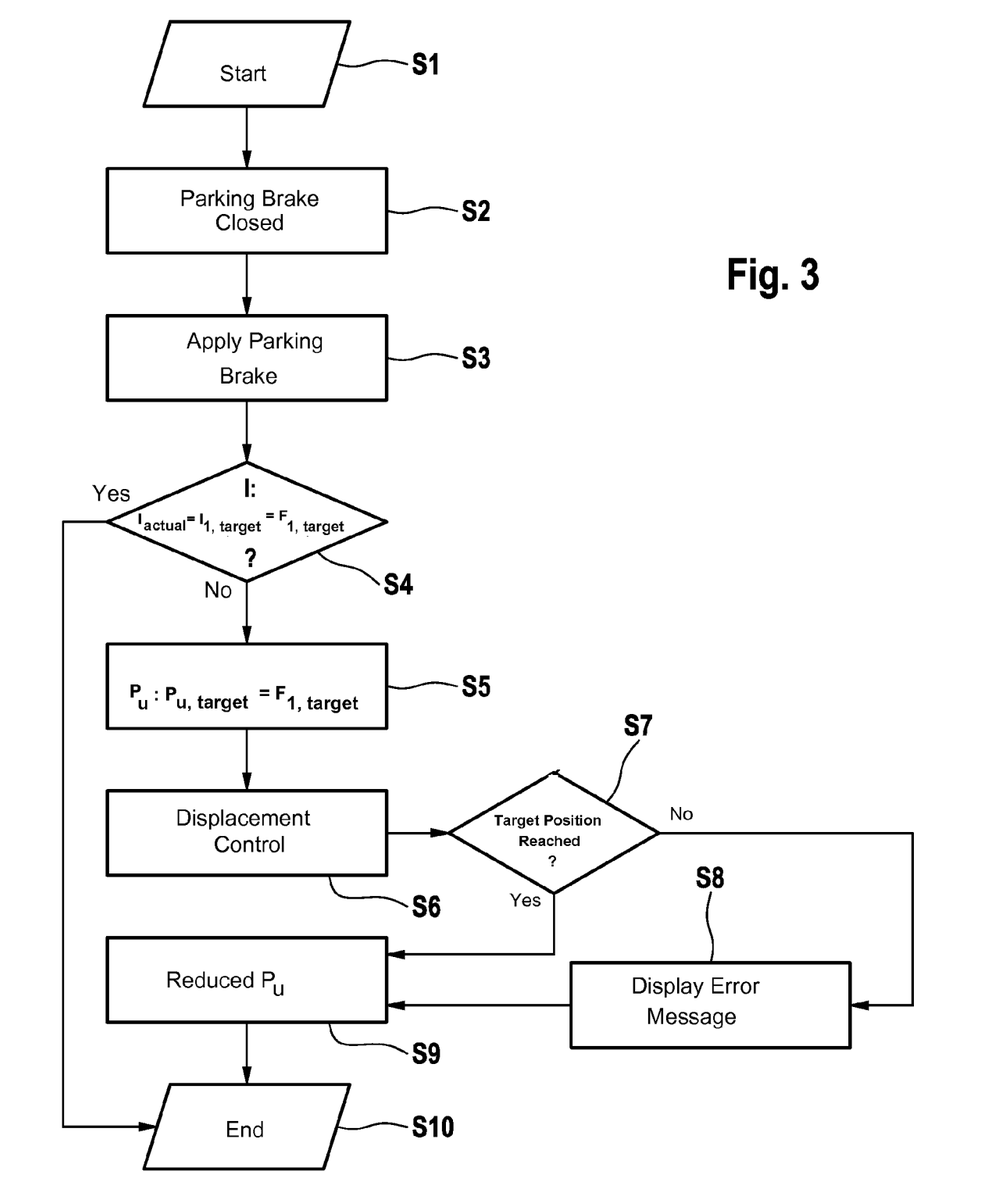
FIG. 3 shows a schematic process diagram for explaining a second exemplary embodiment of the invention, and FIG. 4 show a schematic process diagram for explaining a third exemplary embodiment of the invention.

The second method for hydraulic boosting of the electric parking brake of the rear wheels 12 starts according to FIG. 3 with steps SI to S4, which correspond to those according to FIG. 2. If according to step S4 the actual value $I_{actual}$ of the motor current does not reach the target value $I_{1,target}$ corresponding to the target force value $F_{1,target}$, i.e. the necessary application force $F_{1,target}$ is not set, likewise a hydraulic boost is requested by the controller 20. For this purpose, following step S5 (generation of $P_u$) a hydraulic boosting brake pressure $P_u$ is generated by means of the hydraulic pump 3 with a target pressure $P_{u,target}$ that corresponds to a target inlet pressure value $P_{inlet}$, whose value is smaller than the target force value $F_{1,target}$. For a target force value $F_{1,target}$ of e.g. 140 bar, e.g. 80 bar can be selected as the target inlet pressure value $P_{inlet}$.

The boosting brake pressure $P_u$ corresponding to the target inlet pressure value $P_{inlet}$ is only built up at the brake piston of the brake actuators 2c of the rear wheels 12. The hydraulic pump 3 continues to run.

The further application is performed with the following step S6 ("Further application with displacement control to target position of the brake piston") by driving the brake pistons of the brake actuators 2c at the rear wheels 12, which are subjected to the hydraulic brake pressure $P_u$, to a position corresponding to the necessary application force, i.e. the target force value $F_{1,target}$, by means of displacement control using a displacement-force characteristic stored in the controller 20.

Here we are starting from the position at the end of the application process according to step S3. Starting from here the displacement control uses a target position value having a slightly larger value than the position at the end of the application process. For the target position it is assumed that the brake caliper 2b is applied with a correspondingly greater force. The displacement controller seeks during further application to adjust the brake piston of the brake actuator 2c in the clamping direction to the target position. On achieving the target position, following step S7 ("Target position reached") the hydraulic boosting brake pressure $P_u$ is reduced in step S9 ("Reduce Pu), i.e. the hydraulic pump 3 is shut off. In a different case, i.e. on not achieving the target position, in step S8 ("Display error message") an error message for display to the driver is generated and the boosting brake pressure $P_u$ is reduced with step S9.

The two methods for hydraulic boosting of the electric parking brake explained in combination with FIGS. 2 and 3 have the advantage that the hydraulic boost is only requested or performed if it is also actually necessary. Furthermore, the volume of pressure medium to be generated by the hydraulic pump 3 is very small because, as a result of the application process performed by the parking brake function according to step S3, the brake piston of the brake actuators 2c has already been moved close to the necessary end position before the hydraulic boosting brake pressure acts.

Another advantage is that the described method can also be used for further application of an overheated parking brake during the cooling phase.

Figure 4:
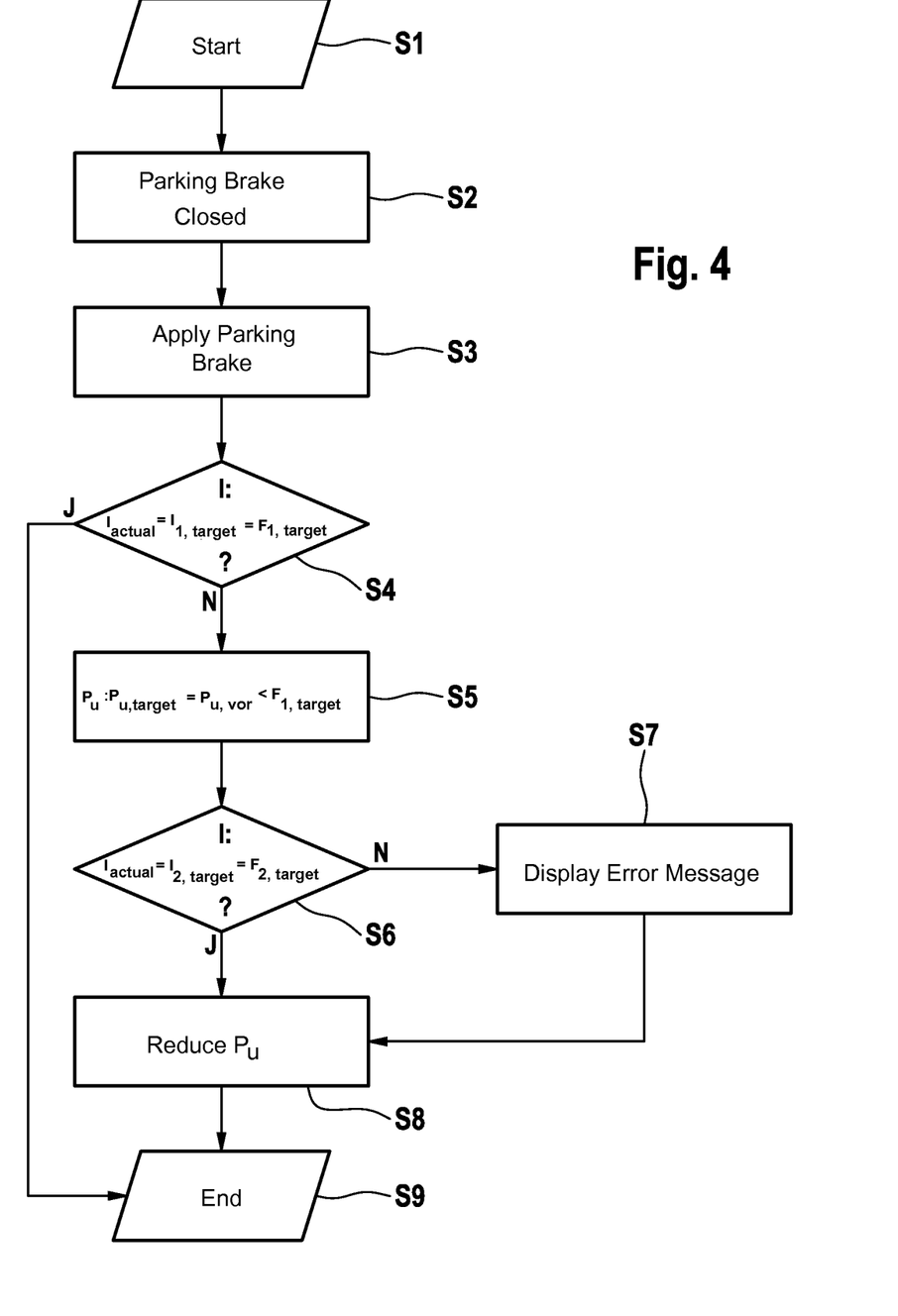

The last exemplary embodiment of a method for hydraulic boosting of the electric parking brake according to FIG. 4 differs from that according to FIG. 3 by the further application function used.

For the further application function, in step S6 a target value $I_{2,target}$ for the motor current I of the direct current motor 2d is used that corresponds to a second target force value $F_{2,target}$, which is reduced relative to the first target force value $F_{1,target}$ used in steps S3 and S4 by a force value corresponding to the boosting brake pressure $P_{inlet}$. The brake piston of the brake actuator 2c subjected to the boosting brake pressure $P_{pre}$ is now applied by the controller 20 using the direct current motor 2d until the actual value $I_{actual}$ of the motor current I reaches or exceeds the target value $I_{2,target}$; the direct current motor 2d is then switched off.

The reduced target force value $I_{2,target}$ is also taken from a characteristic stored in the controller 20. Such characteristic fields are determined for defined hydraulic inlet pressures that are applied to the brake piston of the brake actuator 2c.

For hydraulic inlet pressures between the values for which characteristic fields exist, the corresponding target value $I_{2,target}$ for the motor current I can be interpolated.

If the target value $I_{2,target}$ is not reached by the motor current I, according to step S7 ("Display error message") an error message is generated for the driver and the process is terminated (step S9: "End") following reduction of the hydraulic boosting brake pressure $P_u$ according to step S8 (Reduce $P_u$).

Prior to the further application of the parking brake according to step S6, initially the brake actuator 2c that is subjected to the boosting brake pressure $P_u$ can be controlled by a small displacement amount in the direction of releasing the parking brake by means of a displacement control in order to achieve a defined position for the subsequent further application.

The last described method according to FIG. 4 also has the advantage that a hydraulic boost is only performed if this is actually necessary. Likewise the volume to be supplied by the hydraulic pump 3 for the hydraulic boosting pressure is small because the brake piston of the brake actuator 2d has already been moved close to the necessary end position according to steps S3 and S4.

While the above description constitutes the preferred embodiment of the present invention, it will be appreciated that the invention is susceptible to modification, variation, and change without departing from the proper scope and fair meaning of the accompanying claims.

The invention claimed is:

1. A method for hydraulic boosting of an electric parking brake of a vehicle comprising providing at least one brake actuator (2c, 2d), which for electric and hydraulic operation of the at least one brake actuator (2c, 2d) includes a hydraulic service brake function and an electric parking brake function, wherein an application force (F) electrically generated with the parking brake function is superimposed with a boosting brake force generated by subjecting the brake actuator (2c, 2d) to a hydraulic boosting brake pressure ($P_u$) provided by the service brake function, operating of the parking brake to generate a specified application force, detecting the application force generated by the brake actuator (2c, 2d) as the actual value ($I_{actual}$) by means of a measurement variable (I) representing the actual value, for a measurement of the actual value ($I_{actual}$) that is smaller than a first target value ($I_{1,target}$) representing a first target force value ($F_{1,target}$) of the application force, the brake actuator (2c, 2d) is subjected to a hydraulic boosting brake pressure ($P_u$) that corresponds to a specified target boosting brake pressure value, ($P_{u,target}$) and performing by means of the parking brake function a further application function for further application of the brake actuator (2c, 2d) that is subjected to the hydraulic boosting brake pressure ($P_u$) to achieve the specified application force.

2. The method as claimed in claim 1, further comprising the steps of to generate the hydraulic boosting brake pressure ($P_u$) a means of generating pressure (3), is controlled by means of the service brake function.

3. The method as claimed in claim 2, further comprising in that the target boosting brake pressure value ($P_{u,target}$) is set to a value at which the resulting boosting brake force corresponds to the first target force value ($F_{1,target}$), following the generation of the hydraulic boosting brake pressure ($P_u$) corresponding to the target force value ($F_{1,target}$) the means of pressure generation (3) is switched off, and the boosting brake pressure ($P_u$) applied to the brake actuator (2c, 2d) is hydraulically confined within the brake actuator (2c, 2d).

4. The method as claimed in claim 2, further comprising in that the target boosting brake pressure value ($P_{u,target}$) corresponds to a specified inlet pressure target value ($P_{u,\ inlet}$), wherein the resulting boosting brake force is smaller than the first target force value ($F_{1,target}$), and following the generation of the hydraulic boosting brake pressure ($P_u$) the means of generating pressure (3) is not switched off and the brake actuator (2c, 2d) is further subjected to the boosting brake pressure ($P_u$).

5. The method as claimed in claim 3, further comprising in that for further application of the parking brake the brake actuator (2c, 2d) is controlled by the boosting brake pressure ($P_u$) by means of the parking brake function until the actual value ($I_{actual}$) of the measurement variable (I) of the application force corresponds to a target value ($I_{2,target}$), which is smaller than the first target value ($I_{1,target}$) corresponding to the first target force value ($F_{1,target}$).

6. The method as claimed in claim 4, further comprising in that for further application of the parking brake by means of the parking brake function a displacement control is activated, wherein a brake piston of the brake actuator (2c, 2d) that is subjected to the boosting brake pressure ($P_u$) is controlled to a target position corresponding to the specified application force using a stored displacement-force characteristic.

7. The method as claimed in claim 6, further comprising in that an error message is generated if the brake piston target position is not reached by a determined actual position.

8. The method as claimed in claim 4, further comprising in that
the further application function (2c, 2d) includes further application of the brake actuator by means of the parking brake function and thereby the actual value ($I_{actual}$) of the measurement variable (I) representing the application force generated by the brake actuator (2c, 2d) is detected, and
the further application is terminated if the actual value ($I_{actual}$) of the measurement variable (I) reaches a second target value ($I_{2,target}$) corresponding to a second target force value ($F_{2,target}$) wherein the second target force value ($F_{2,target}$) is reduced relative to the first target force value ($F_{1,target}$) by a force value corresponding to the boosting brake pressure ($P_u$).

9. The method as claimed in claim 8, further comprising in that an error message is generated if the actual value ($I_{actual}$) of the measurement variable (I) does not reach the second target value ($I_{2,target}$).

10. The method as claimed in claim 8, further comprising in that prior to performing the further application, the brake actuator (2c, 2d) that is subjected to the boosting brake pressure ($P_u$) is controlled by a small displacement amount in the direction of releasing the parking brake by means of a displacement control.

11. The method as claimed in claim 1 further comprising in that the hydraulic boosting brake pressure ($P_u$) is reduced following performance of the further application function.

12. The method as claimed in claim 1, further comprising in that the brake actuator (2c, 2d) for performing the parking brake function is driven by an electric motor (2d) and the motor current of the electric motor (2d) is detected as the measurement variable (I) representing the application force.

* * * * *